(12) United States Patent
Jost

(10) Patent No.: US 7,518,497 B2
(45) Date of Patent: Apr. 14, 2009

(54) WHEEL UNIT FOR PROVIDING DATA

(75) Inventor: Andreas Jost, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 221 days.

(21) Appl. No.: 11/348,761

(22) Filed: Feb. 7, 2006

(65) Prior Publication Data

US 2006/0226966 A1    Oct. 12, 2006

(30) Foreign Application Priority Data

Mar. 10, 2005    (DE) .................. 10 2005 011 133

(51) Int. Cl.
*B60C 23/00*    (2006.01)
(52) U.S. Cl. .................. 340/445; 340/426.33; 340/442; 340/447; 73/146; 73/146.5
(58) Field of Classification Search ........... 340/445, 340/444, 442, 447, 870.07, 426.33; 73/146, 73/146.2, 146.5
See application file for complete search history.

(56) References Cited

U.S. PATENT DOCUMENTS

| 5,774,047 | A | 6/1998 | Hensel, IV |
| 6,181,241 | B1 | 1/2001 | Normann et al. |
| 6,535,116 | B1 * | 3/2003 | Zhou .......................... 340/447 |
| 6,604,416 | B2 * | 8/2003 | Tsujita ....................... 73/146.5 |
| 6,972,671 | B2 * | 12/2005 | Normann et al. ............ 340/442 |
| 6,972,691 | B2 * | 12/2005 | Okubo .................. 340/870.07 |
| 6,980,099 | B2 | 12/2005 | Kroitzsch et al. |
| 7,015,804 | B2 * | 3/2006 | Okubo et al. ................ 340/447 |
| 7,215,244 | B2 * | 5/2007 | Katou et al. ................. 340/447 |
| 2004/0008108 | A1 | 1/2004 | Kroitzsch et al. |
| 2004/0164854 | A1 | 8/2004 | Nantz et al. |

FOREIGN PATENT DOCUMENTS

| DE | 102 29 465 A1 | 1/2004 |
| DE | 103 24 083 A1 | 9/2004 |
| EP | 0 760 299 A1 | 3/1997 |
| EP | 0 861 160 B1 | 4/2000 |

* cited by examiner

*Primary Examiner*—Davetta W Goins
(74) *Attorney, Agent, or Firm*—Laurence A. Greenberg; Werner H. Stemer; Ralph G. Locher

(57) ABSTRACT

In order to determine the tire positions or wheel positions automatically while the vehicle is in operation, the attenuation along a transmission path from the tire to a fixed position on the vehicle is measured and compared with stored values. Systems of this kind are error prone when other vehicles using similar systems are located in the receiving range. In order to increase the reliability of such a system it is useful to determine the attenuation along the transmission paths between the wheel units and compare it with known values. Toward that end, the novel wheel unit enables data to be provided by way of which the attenuation of the transmission path from one wheel unit to another wheel unit can be determined.

26 Claims, 2 Drawing Sheets

WHEEL UNIT FOR PROVIDING DATA

BACKGROUND OF THE INVENTION

Field of the Invention

The invention lies in the automotive technology field. More specifically, the invention relates to a wheel unit for providing data. The wheel unit has a transmitter and a receiver connected to an encoder.

In the automotive industry there is an increasing need for automatic tire pressure checking systems. Of primary importance here is the tire pressure, but other parameters such as temperature can also be of interest. To this end sensors are incorporated in the tire, on the tire or in the valve, to measure the tire pressure. The measured values are then transmitted to a central evaluation unit.

One challenge here is to identify the position of the tire on the vehicle. This is normally programmed-in at the factory at the end of the production line. Each tire possesses its own address for this purpose. The tires however mostly do not remain in the same position during their lifetime. Sometimes the front tires are swapped with the rear tires to balance out the different levels of wear. Also when the change is made from summer to winter tires the tires are normally not fitted at the same position as they were in the previous year.

Various approaches to the solution are known from the prior art which make an automated identification of the tire positions possible. To wit:

A method is known from European patent EP 0 861 160 B1 and U.S. Pat. No. 6,181,241 B1 for assigning transmitters to receive antennas in which each wheel is assigned a pressure measurement sensor, a transmitter and a transmit antenna. In addition each wheel is assigned a receive antenna on the bodywork which is linked via a cable in each case to a receiver and evaluation unit. The codes are assigned to the wheel positions by a transmitter or the associated transmit antenna sending a signal being received by all receive antennas and by the wheel positions of that receive antenna which delivers the signal with the greatest intensity being assigned to the corresponding transmitter and its identifier.

The installation and maintenance of such a system is relatively expensive however since there have to be receivers accommodated in the vicinity of all the tire positions and these have to be cabled up.

A tire pressure monitoring system is known from U.S. Pat. No. 5,774,047 which contains at least two receive antennas and can determine the wheel positions by means of the phase difference and the polarity of identified signals at the different positions of the antennas on the bodywork.

Such an evaluation of the polarity and phase relationships of the signals is however associated with a significant outlay in circuitry.

A device is known from European published patent application EP 0 760 299 A1 which determines the direction of rotation of the wheels (clockwise/counter clockwise) and can determine in this way whether the wheel is located on the left hand or right hand side of the vehicle.

The disadvantage of this invention is that the axle on which the wheel is mounted remains unknown, and that an additional sensor is required for detecting the direction of rotation.

A configuration is known from DE 102 29 465 A1 and U.S. Pat. No. 6,980,099 B2 in which at least one receive antenna is positioned in the motor vehicle and exhibits such a directional characteristic that receive signals of different power in each case are produced at the location of the receive antenna for at least two send antennas. These signals are compared to threshold values stored in an evaluation unit or ranges of values and can thus be assigned to a wheel position.

With such a configuration the absolute values of the signal power are measured at the location of the receive antenna. The transmit powers, i.e., the transmission power levels, of the transmitters can vary however, as a result of a temperature variations for example. This can lead to an incorrect assignment of a signal to wheel position.

In order to prevent the effect of fluctuations in the transmission power of a transmitter mounted on a tire, a characteristic quantity representing the transmission path "wheel unit—antenna" can be determined instead of a location-dependent characteristic quantity such as the power at the location of an antenna mounted on the vehicle. A characteristic quantity of said kind is, for example, the attenuation along the transmission path.

In the present document the term "attenuation" includes any characteristic quantity representing an attenuation, such as, for example, the percentage share of the energy of an emitted signal that arrives at the end of a radio link. In the same sense the term "intensity" includes any characteristic quantity representing an intensity, such as, for example, the field strength, the power, the power density or the energy density.

However, even a system in which the attenuation along the wheel unit—antenna transmission path is determined can be subject to noise interference caused by other vehicles which are in the receiving range and which use a similar system. The problem of noise interference due to adjacent vehicles is fundamental and exists also with the other known systems. For this reason it is desirable to provide additional information which allows inferences to be made about the relative positions of the wheels to one another. If, for example, only one tire position can be determined precisely, due to noise interference caused by adjacent vehicles, further positions can be determined on the basis of the relative positions of the wheels to one another.

SUMMARY OF THE INVENTION

It is accordingly an object of the invention to provide a wheel unit which overcomes the disadvantages of the heretofore-known devices and methods of this general type and which permits data to be provided that can be used to determine the attenuation of the transmission path from one wheel unit to another wheel unit.

With the foregoing and other objects in view there is provided, in accordance with the invention, a wheel unit, comprising:

an encoder, a transmitter connected to said encoder, and a receiver connected to said encoder;

a device for measuring an intensity of a signal transmitted by said transmitter of the wheel unit;

a further device for measuring an intensity of a signal transmitted by a transmitter of another wheel unit; and said encoder encoding at least one of the intensities measured by said device and said further device in a message to be transmitted by way of said transmitter.

As a result of the fact that a means for measuring the intensity of a signal transmitted by the transmitter is provided, a further means for measuring the intensity of a signal transmitted by another wheel unit is provided, the encoder encodes at least one of the measured intensities in a message which can be transmitted by means of the transmitter, the intensities of a signal which is transmitted by a first wheel unit and received by a second wheel unit can be measured at the location of both wheel units and provided in an evaluation unit for further processing. The attenuation along the transmission path can be determined by forming the quotient.

In advantageous developments it can be provided that
i) the wheel unit can be instructed at what time it is to transmit,
ii) the wheel unit can detect signal collisions,
iii) the wheel unit can report signal collisions,
iv) the wheel unit can be instructed to resend a signal if the signal has failed to reach its destination,
v) the wheel unit can be operated as a repeater. Messages which are received by the wheel unit can be resent. In particular if the transmission path to an evaluation unit attached to the vehicle is shielded (for example by an exhaust pipe), in this way the message can nonetheless be sent to the evaluation unit by alternate paths,
vi) only one evaluation unit with an antenna must be mounted on the vehicle.

Owing to the fact that the wheel unit has a receiving unit, it can receive and forward not only data, but also control signals such as, for example, acknowledgement signals or signals which communicate to the wheel unit at what time intervals it may transmit. This opens up possibilities for coordinating the transmission behavior of wheel units. By this means it becomes possible, for example, to operate a plurality of wheel units in Time Division Multiple Access (TDMA), in Frequency Division Multiple Access (FDMA), in Frequency Division Duplex (FDD) and/or in Code Division Multiple Access (CDMA) mode. In this way signal collisions can be avoided or, in the event of a signal collision, a transmitter can be instructed to resend a message.

The presence of a receiving unit in the wheel unit also creates the possibility that a wheel unit autonomously detects periodically recurring free timeslots and uses these to send its own signals.

In addition to a measurement of the signal power, however, a measurement of other parameters is also conceivable, such as, for example, the phase, the polarization, or the time of arrival of the signal for calculating the transit delay of a signal from the time of its generation until it is detected.

Further advantages can be produced as a result of the following features, either individually or in combination with one another:

Owing to the fact that the encoder encodes the measured intensity of the signal transmitted by the transmitter and the intensity of the signal transmitted by another wheel unit in a message which can be transmitted by means of the transmitter, a central evaluation unit that is mounted on the vehicle can be provided with data by means of which the attenuation of the transmission path from one wheel unit to another wheel unit can be determined. A particularly advantageous aspect of this embodiment is that the attenuation does not have to be determined in a wheel unit. This simplifies the manufacture of the wheel unit.

Owing to the fact that the wheel unit has an identifier which is contained in the message, the sender of one message can be differentiated from the senders of other messages.

Owing to the fact that connected to the encoder there is a local evaluation unit in which there is stored a function which determines the attenuation along the transmission path from two intensities measured at the ends of a transmission path, the attenuation can also be determined in the wheel unit. The transmitting unit of the wheel unit can then transmit the determined attenuation to an evaluation unit mounted on the vehicle. The advantage of a local evaluation unit in the wheel unit is a reduction in the data traffic in the system as a whole.

Owing to the fact that the wheel unit forwards the message sent by another wheel unit, the wheel unit becomes a repeater. As a result the reliability of the system can be increased, since messages which have not reached the evaluation unit, for example due to a shielding influence such as an exhaust pipe, can, by this means, reach their destination via other paths.

Owing to the fact that the wheel unit has a clock, the wheel unit can be instructed to transmit at regular or at predefined intervals. This enables the overall system to be operated using the TDMA method, as a result of which signal collisions can be avoided. The presence of a clock and a receiver in the wheel unit also enables the wheel unit to autonomously detect free timeslots and make projections about the probability of future free timeslots. Thanks to the clock the wheel unit can be instructed to send messages and signals in timeslots that are free with a high degree of probability.

Owing to the fact that the message has a timestamp derived from the clock, it is possible to differentiate signals from one another without the wheel unit requiring an individual identifier.

Owing to the fact that the wheel unit transmits messages (MSG1, MSG2) at time intervals derived from the clock, the source of the signal can be instructed to resend the signal.

Owing to the fact that the wheel unit is assigned time intervals during which it may transmit, the risk of signal collisions can be substantially reduced.

Owing to the fact that the wheel unit acknowledges a received message with an acknowledgement signal, the transmitting wheel unit can be instructed to resend an unacknowledged message.

Owing to the fact that the wheel unit has means for detecting signal collisions, the wheel unit can be instructed to resend the signal in the event of a signal collision.

Owing to the fact that the wheel unit has means for activating and deactivating the wheel unit, the wheel unit can, if necessary, be deactivated, switched off or placed in a sleep mode, as a result of which the energy needs of the wheel unit can be reduced. For example, when the vehicle is started and stopped, the wheel units can be instructed to switch themselves on and off, respectively. For this purpose motion sensors can be installed in the wheel units. However, it is also possible that the wheel units can be instructed to switch themselves on or off by a central evaluation unit that is connected to the ignition lock.

Owing to the fact that the wheel unit has means of increasing or reducing the transmission level, the transmission level can be adjusted to suit the environment. If, for example, the vehicle is located in an environment with many noise interference signals, such as, say, on a busy road with heavy traffic, the wheel unit can be instructed, by a central evaluation unit for example, to transmit at a higher level, thereby improving the signal-to-noise ratio. If at a later time the vehicle is situated at a location with few interference noises, on a quiet country road for example, the wheel unit can in turn be instructed to lower the transmission level in order to save energy.

Other features which are considered as characteristic for the invention are set forth in the appended claims.

Although the invention is illustrated and described herein as embodied in a wheel unit, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best under-

DESCRIPTION OF THE PREFERRED EMBODIMENTS

Figure 1:
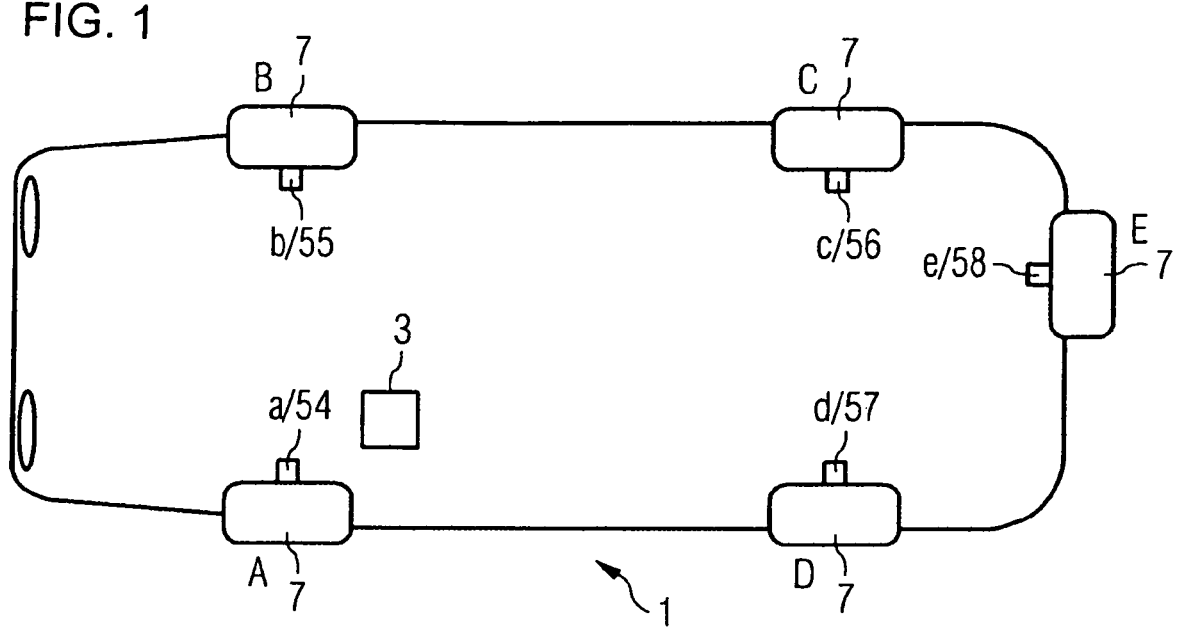
FIG. 1 is a diagram of a vehicle with a tire pressure monitoring system in which the wheel units according to the invention are integrated.

Referring now the the figures of the drawing in detail and first, particularly, to FIG. 1 thereof, there is illustrated a motor vehicle 1 having an arrangement of wheel positions A, B, C, D, E, such as is typical for passenger cars. A wheel 7, each having a wheel unit a, b, c, d, e, each of which has an identifier 54, 55, 56, 57, 58 individualizing the wheel unit a, b, c, d, e, is mounted at each wheel position A, B, C, D, E. A central evaluation unit 3 is mounted in proximity to one of the wheel positions A, B, C, D, E.

FIG. 1 appears identically in my copending patent application, entitled "Method and Device for Assigning a Wheel Unit to its Wheel Position." The wheel unit of this application is particularly suited for use in that method and device and, accordingly, the copending application is herewith incorporated by reference in its entirety. This application also claims the benefit, under 35 U.S.C. § 119, of German patent application 10 2005 011 133.5, filed Feb. 7, 2005; the German application is herewith incorporated by reference in its entirety.

Figure 2:
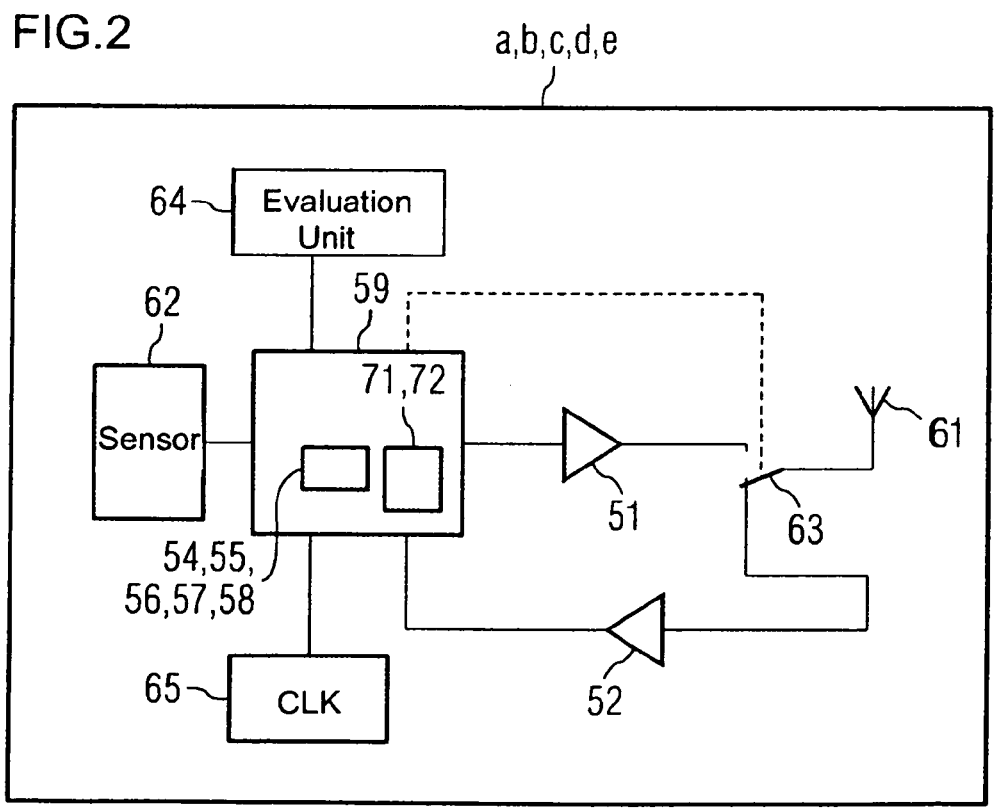
FIG. 2 is a block schematic of a wheel unit having a transmitter and a receiver.

FIG. 2 shows a wheel unit a, b, c, d, e in one embodiment of the invention. An encoder 59 is connected to a transmitter 51 (transmission unit), a receiver 52 (receiving unit), and a sensor 62, which measures the tire pressure. The encoder 59 has an individualizing identifier 54, 55, 56, 57, 58 which permits a wheel unit a, b, c, d, e to be differentiated from other wheel units a, b, c, d, e. In this embodiment the transmitter 51 and the receiver 52 are connected to the same antenna 61. The wheel unit a, b, c, d, e can switch its mode of operation between transmitting mode and receiving mode by way of an electronic switch 63 which is controlled by the encoder 59. In a further embodiment, each of the transmitter 51 and the receiver 52 has their own antenna. In that case an electronic switch 63 is not necessary.

In the embodiment shown in FIG. 2, a level detector 71, 72 is integrated into the encoder 59. The level detector is used for measuring the intensity of signals of its own wheel unit a, b, c, d, e, as well as of other wheel units a, b, c, d, e. The encoder can encode and decode messages MSG1, MSG2. In the embodiment shown, the wheel unit a, b, c, d, e has its own local evaluation unit 64 which determines the attenuation along a transmission path from intensity measurements.

In a further, non-illustrated embodiment, the wheel unit does not have its own evaluation unit 64 for determining the attenuation. In contrast there is located on the vehicle a central evaluation unit 3 to which the wheel units a, b, c, d, e transmit the messages MSG2. In that embodiment, a measured intensity is transmitted by means of the transmitter 51 to a central evaluation unit 3 which is mounted on the vehicle 1.

A challenging problem is to assign a message MSG1, MSG2 to the specific wheel unit a, b, c, d, e which transmitted the message MSG1, MSG2. This requires that the messages MSG1, MSG2 of different sources must be distinguishable from one another. This is achieved, for example, by each wheel unit a, b, c, d, e having its own identifier 54, 55, 56, 57, 58 which is packed into the messages MSG1, MSG2. A tire pressure system can then be operated in CDMA and in TDMA mode.

An identifier 54, 55, 56, 57, 58 of the wheel units a, b, c, d, e is not absolutely essential, however. The origin of the messages MSG1, MSG2 can also be differentiated by the fact that the transmission units 51 of the wheel units a, b, c, d, e transmit a message MSG1, MSG2 at regular intervals, every 60 seconds for example. In a further embodiment the wheel unit a, b, c, d, e therefore has a clock 65. The messages MSG1, MSG2 can then be provided with a timestamp derived from the clock 65 as a means of differentiation. Given sufficiently large time intervals between the transmitted messages MSG1, MSG2, an evaluation unit 3, 64 assigns two intensity measurements arriving essentially simultaneously, each of which is packed into a message MSG2, to the same source from which the message MSG1 originated.

Figure 3:
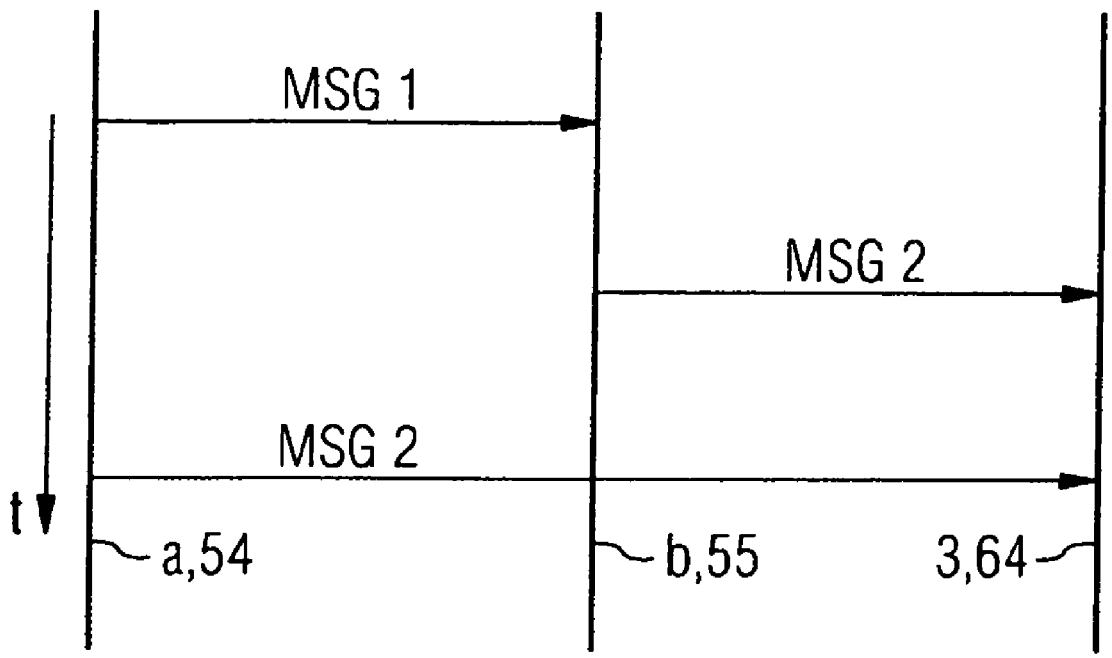
FIG. 3 is a message flow diagram of the messages that are to be sent.

FIG. 3 shows an exemplary flow diagram indicating the time progression of messages MSG1, MSG2 to be sent by two wheel units a, b operating in TDMA mode. By way of example the first wheel unit a has the identifier 54 and the further wheel unit b has the identifier 55. The time axis is indicated by the reference character t. Messages MSG1 are transmitted between the wheel units and messages MSG2 are transmitted between a wheel unit and an evaluation unit by way of a modulation of the signals transmitted on a higher level by the transmitter 51. The first wheel unit a transmits a message MSG1 which has the identifier 54 of the transmitting first wheel unit a in the field S. Other fields of the message MSG1 can have dummy values x—see, FIG. 4.

The local intensity of the signal which contains the message MSG1 is measured by all the wheel units a, b, c, d, e in the receiving range. In particular, the intensity I1 at the location of the first wheel unit a which transmitted the signal is also measured, as too is the intensity I2 at the location of the further wheel unit b which, like the first wheel unit a, is shown in the flow diagram. Each of the wheel units a, b, c, d, e subsequently provides a message MSG2 containing, in field I, the measured local intensity, in field S, the identifier 54 of the wheel unit a sending the message MSG1, and, in field R, its own identifier 54, 55, 56, 57, 58, and in the next time window delivers the message MSG2 to the evaluation unit 3, 64.

Thus, the evaluation unit 3, 64 has all the information available to it in order to be able to evaluate a received message MSG2. On the basis of the contents and the structure, the evaluation unit 3, 64 can determine, for any message MSG2 provided, which wheel unit a, b, c, d, e transmitted the associated message MSG1—this is the content of field S—and which wheel unit a, b, c, d, e measured the intensity of the signal underlying the message MSG1—this is the content of field R. If, for example, the contents of field S and field R are identical in a message MSG2, then what is involved is an intensity measurement at the location of the transmitting wheel unit a, b, c, d, e whose identifier is contained in the fields S, R.

Thus, the evaluation unit 3, 64 has all the information available to it in order to be able to calculate the attenuation along the transmission path from the first wheel unit a to the further wheel unit b, namely the local intensities I1, I2 of the signal of the message MSG1 at the location of the transmitting first wheel unit a and at the location of the further wheel unit b. The evaluation unit 3, 64 also has all the information available to it in order to assign the determined attenuation to the wheel units a, b involved. In the example quoted, the quotient of the message MSG2 (I2, 54, 55) provided by wheel unit b and the message MSG2 (I1, 54, 54) provided by wheel unit a represents the attenuation between wheel unit a and b.

Figure 4:
FIG. 4 is a diagram showing the structure of a message from a wheel unit to a wheel unit.

FIG. 4 shows a possible structure of a message MSG1, including a field S which contains the identifier 54, 55, 56, 57, 58 of that wheel unit a, b, c, d, e which generated the signal. A message MSG1 is generated in order to measure its intensity at the location of its source and at the location of a further wheel unit a, b, c, d, e so as to be able subsequently to calculate the attenuation along the transmission path from the measured intensities. In order to achieve a uniform structure for the messages MSG1 and MSG2, two fields are provided in the message MSG1 which are identified by a dummy value x. A uniform structure of the messages MSG1 and MSG2 is not a requirement for the functioning of the invention. However, it can simplify the manufacture of the encoder 59. It also offers a simple way for a message MSG2 earlier in time to assume the function of the message MSG1, as a result of which the data traffic in the system can be reduced.

Figure 5:
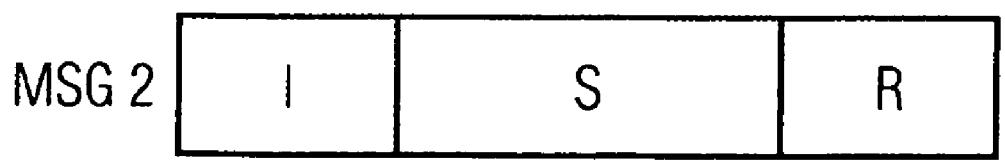
FIG. 5 is a diagram showing the structure of a message from a wheel unit to an evaluation unit.

FIG. 5 shows a possible structure of a message MSG2 which has a field I, a field S and a field R. Field R contains the identifier of a wheel unit at the location of which the intensity of the signal of a message MSG1 was measured. Field S contains the identifier 54, 55, 56, 57, 58 of that wheel unit which sent the message MSG1. The measured intensity is contained in field I. The fields R and S may contain the same identifier. This means that what is involved is an intensity measurement at the location of the transmitting wheel unit a, b, c, d, e.

This application claims the priority, under 35 U.S.C. § 119, of German patent application No. 10 2005 011 133.5, filed Mar. 10, 2004; the prior application is herewith incorporated by reference in its entirety.

I claim:

1. A wheel unit, comprising:
   an encoder, a transmitter connected to said encoder, and a receiver connected to said encoder;
   a device for measuring an intensity of a signal transmitted by said transmitter of the wheel unit;
   a further device for measuring an intensity of a signal transmitted by a transmitter of another wheel unit; and
   said encoder encoding at least one of the intensities measured by said device and said further device in a message to be transmitted by way of said transmitter.

2. The wheel unit according to claim 1, wherein said encoder is configured to encode the measured intensity of the signal transmitted by said transmitter and the intensity of the signal transmitted by the transmitter of the other wheel unit in a message to be transmitted by way of said transmitter.

3. The wheel unit according to claim 2, wherein an identifier related to the wheel unit is contained in the message.

4. The wheel unit according to claim 1, wherein an identifier related to the wheel unit is contained in the message.

5. The wheel unit according to claim 1, which further comprises a local evaluation unit connected to said encoder, said local evaluation unit having stored therein a function determining an attenuation along a transmission path from two intensities measured at an end of the transmission path.

6. The wheel unit according to claim 2, which further comprises a local evaluation unit connected to said encoder, said local evaluation unit having stored therein a function determining an attenuation along a transmission path from two intensities measured at an end of the transmission path.

7. The wheel unit according to claim 4, which further comprises a local evaluation unit connected to said encoder, said local evaluation unit having stored therein a function determining an attenuation along a transmission path from two intensities measured at an end of the transmission path.

8. The wheel unit according to claim 1, configured to forward a message sent from another wheel unit.

9. The wheel unit according to claim 2, configured to forward a message sent from another wheel unit.

10. The wheel unit according to claim 4, configured to forward a message sent from another wheel unit.

11. The wheel unit according to claim 7, configured to forward a message sent from another wheel unit.

12. The wheel unit according to claim 1, which further comprises a clock disposed in the wheel unit.

13. The wheel unit according to claim 2, which further comprises a clock disposed in the wheel unit.

14. The wheel unit according to claim 4, which further comprises a clock disposed in the wheel unit.

15. The wheel unit according to claim 5, which further comprises a clock disposed in the wheel unit.

16. The wheel unit according to claim 8, which further comprises a clock disposed in the wheel unit.

17. The wheel unit according to claim 12, wherein said encoder is configured to add to the message a timestamp derived from said clock.

18. The wheel unit according to claim 17, configured to transmit messages in time intervals derived from said clock.

19. The wheel unit according to claim 12, configured to transmit messages in time intervals derived from said clock.

20. The wheel unit according to claim 1, configured to acknowledge a received message with an acknowledgement signal.

21. The wheel unit according to claim 2, configured to acknowledge a received message with an acknowledgement signal.

22. The wheel unit according to claim 1, which further comprises means disposed in the wheel unit for detecting signal collisions.

23. The wheel unit according to claim 2, which further comprises means disposed in the wheel unit for detecting signal collisions.

24. The wheel unit according to claim 8, which further comprises means disposed in the wheel unit for detecting signal collisions.

25. The wheel unit according to claim 1, which further comprises means for activating and deactivating the wheel unit.

26. The wheel unit according to claim 1, which further comprises means in the wheel unit for increasing or lowering a transmission power level.

* * * * *